UNITED STATES PATENT OFFICE.

FRITZ ZUCKMAYER, OF ELBERFELD, GERMANY, ASSIGNOR TO DR. WALTHER WOLFF AND COMPANY, GESELLSCHAFT MIT BESCHRÄNKTER HAFTUNG, OF ELBERFELD GERMANY, A COMPANY.

ART OF PREPARING IRON-ALBUMINOUS COMPOUNDS CONTAINING PHOSPHORUS.

1,027,968. Specification of Letters Patent. Patented May 28, 1912.

No Drawing. Original application filed June 30, 1910, Serial No. 569,703. Divided and this application filed April 15, 1911. Serial No. 621,234.

*To all whom it may concern:*

Be it known that I, FRITZ ZUCKMAYER, a citizen of the German Empire, residing at Elberfeld, Kingdom of Prussia, Empire of Germany, have invented certain new and useful Improvements in the Art of Preparing Iron-Albuminous Compounds Containing Phosphorus; and I do hereby declare the following to be a full, clear, and exact description of the invention, such as will enable others skilled in the art to which it appertains to make and use the same.

This invention relates to albuminous substances containing iron and phosphorus and the manufacture of the same.

The invention has for its objects the preparation of such compounds in a simple and economical manner and, in particular, to obtain albuminous compounds containing iron and phosphorus in a condition in which the stomach will not be disagreeably affected thereby, and in which they will be readily dissolved by the intestinal liquids and properly assimilated by the human organism. I have found that new compounds containing albumin, iron and phosphorus having these characteristics, can be readily obtained, if an iron salt and metaphosphoric acid are caused to react on an albuminous substance of animal or of vegetable origin, or upon a halogen derivative of such albuminous substance. The new compounds so obtained are iron-albuminous compounds rich in phosphorus, having acid reaction and forming salts with bases. Of these salts the alkali-salts are soluble, while the earthy-alkali salts and the heavy metal salts thereof are soluble with difficulty or insoluble.

In carrying out my invention I may employ albuminous substances of animal or vegetable origin in crude or refined condition, including their decomposition products such as albumoses and peptones, which are, for the purposes of this invention, to be considered as equivalents and which are included in the term "albuminous substances." I also include under this term the halogen derivatives of all of the above, which are also to be considered as equivalents of the same for the purposes of this invention.

The metaphosphoric acid employed in carrying out my invention may be in the form of the vitreous metaphosphoric acid of the trade, or it may be employed in the form of an alkali salt, earthy alkali salt, or iron salt of the said acid, or it may be employed in its nascent condition due to the reaction of water on phosphorus-pentoxid. All these forms are included in the term "metaphosphoric acid" as employed in the claims.

In my application, Serial Number 569,703, filed on June 30th, 1910, of which this application is a divisional application, I have claimed this invention generically. Specifically the present improvement is distinguished from that covered in said application by the order in which the metaphosphoric acid radical and the iron are caused to act on the albuminous substance. From another point of view the present improvement is specifically distinguished from the invention specifically claimed in said parent application by the fact that under my said present invention a halogenated albuminous compound is acted on by the said reagents and, moreover, that the said present invention comprises as a product a halogen-iron albuminous compound whose properties are defined below.

The iron albuminous compounds rich in phosphorus, and which contain also a haloid, may be obtained either by the reaction of metaphosphoric acid and an iron compound on a halogen derivative of an albuminous compound, or by halogenizing, according to known methods, a halogen-free ferro-albuminous compound containing phosphorus obtained according to this invention.

In carrying out this invention the starting materials are combined in relative quantities such that, after they have been mixed, no precipitate is formed on adding dilute alkalis until weak alkaline reaction occurs.

The new compounds may be separated and obtained ready for use by precipitating them from their alkaline solutions by the addition of acids.

The new haloid iron-phosphorus albuminous compounds obtained by my new process have the following properties. They are soluble in dilute alkalis or dilute solutions of alkali-carbonates, forming with these bases soluble salts. These salts are precipitated from such solutions by adding thereto alcohol. From the solutions in alkalis the new compounds are precipitated by salts of the earthy alkalis in the form of difficultly soluble salts of the earthy alkali-metals. Similarly, when adding a salt of a heavy metal to a solution of an alkali salt of the new compound, the compound of the new albuminous body with the corresponding heavy metal is precipitated.

A very important property of the new compounds is that they are insoluble in the gastric juices, and that they are not digested by pepsin combined with hydrochloric acid, and that, on the contrary, they are readily dissolved by the alkaline intestinal liquids or juices. When acting on these new haloid iron-phosphorus albuminous compounds with pepsin combined with hydrochloric acid, no halogen is split off. This property, in connection with its insolubility or indigestibility in pepsin combined with hydrochloric acid, distinguishes the new haloid ferro-albuminous compound from the ordinary haloid albumins, such, for example, as iodo-casein or casein iodid, which dissolves in pepsin-hydrochloric acid after a very brief time, the iodin being split off in ionized form.

In water and organic solvents the new compounds are insoluble. When dissolving the new compounds through the intervention of sodium carbonate (soda), the new compounds give rise to a green color upon adding a solution of ammonium sulfid. A precipitate is formed from such solution only after the same has been allowed to stand for many hours. Phosphoric acid can be detected in the new products only by decomposing the same with acids or alkalis, or by incinerating the same.

The new compounds may be obtained with varying percentages of iron and phosphorus, according to the relative quantities of the component substances employed in preparing the same. The content of iron to be obtained is about 15%, that of phosphoric acid anhydrid ($P_2O_5$) about 20%.

By reason of the above detailed properties, these new compounds contain iron and phosphoric acid in a form very favorable to ready assimilation by the organism and which will not tend to derange the stomach. They are, therefore, to be employed for therapeutic purposes and as remedies for anemia, chlorosis and other diseases and disorders of alimentation, the dose being about from 2 to 7 grams daily for adults and half the quantity for children.

In order to fully disclose my invention I will describe in detail a number of examples embodying what I consider the best manner of carrying the same into effect.

Example 1: To a solution of 10 kilograms of casein in 300 liters of water and 2 kilograms of soda lye (NaHo) of 38° Baumé are added 2 kilograms of metaphosphoric acid of the trade dissolved in water, and the whole is stirred to form an intimate mixture. To this mixture there are then added 8 liters of a 50% solution of iron chlorid, the mixture being then rendered slightly alkaline by adding thereto dilute aqueous solution of ammonia sufficiently to form a solution of the whole. Thereupon an acid is added, such for example, as acetic acid, whereby the new compound is precipitated, the same being then separated by filtration, washed with water and dried. This new iron albuminous compound contains about 8% of iron, 12% of phosphoric acid anhydrid ($P_2O_5$) and 11.8% nitrogen.

Example 2: 3 kilograms of vitreous phosphoric acid dissolved in 30 liters of water are added to a solution of 10 kilograms of the white of chicken eggs in 300 liters of water. A white precipitate is thereby formed. Thereupon 10 liters of a 50% solution of iron chlorid are added to the whole and the mixture so formed is then rendered weakly alkaline by adding dilute alkali solution. Thereby the whole is caused to form a solution from which a new compound according to this invention is precipitated by means of acid. The new body is isolated by filtering and washing with water and is then dried. It contains about 11% of iron, 19% phosphoric acid anhydrid ($P_2O_5$) and 9.5% nitrogen.

Example 3: 6 kilograms of protalbumose from casein are dissolved in 200 liters of water and to this solution is added a solution of 2 kilograms of the metaphosphoric acid of trade in 30 liters of water. A white precipitate is thus formed. To this mixture there are then added 10 liters of a 50% solution of chlorid of iron and thereupon a weak alkaline reaction is effected by the addition of dilute solution of ammonia. A solution is thereby obtained, and from this solution a new iron-albuminous compound is separated by the addition of acid. As in the former examples, the new product is isolated by filtering, washing with water, and drying. On analyzing the same it is found that it contains about 16% of iron, 21% of phosphoric acid anhydrid ($P_2O_5$) and 9% nitrogen.

Example 4: 4 kilograms of iodo-casein or casein iodid are dissolved in 150 liters of water together with a small quantity of ammonia solution and thereupon there is added thereto a solution of 0.8 kilograms of commercial metaphosphoric acid in 4 liters of water, this addition resulting in a yellowish precipitate. To the whole are now added 6 liters of a 25% solution of iron chlorid, whereupon the bath is heated to from 40° to 50° centigrade, and sufficient ammonia solution is added to obtain weak alkaline reaction. A solution of the precipitate is thereby obtained. From this solution a new compound is separated by adding an acid, such, for example, as hydrochloric acid. The same is then separated and purified by filtering and washing with water until free of chlorin. It is then dried. The new product, so obtained, contains about 9% of iron, 12% of $P_2O_5$, 7% of iodin, and 11.4% of nitrogen.

Example 5: 5 kilograms of casein are digested with the proper mixture of pepsin and hydrochloric acid and the so obtained mixture of casein-albuminoses and peptones is rendered neutral by adding thereto sufficient soda-lye (sodium hydrate solution). It is thereupon treated with a solution of 1 kilogram of iodin in 4 liters of water and 1 kilogram of potassium iodid, the mixture being maintained at 40°, centigrade, and rendered slightly alkaline by the addition thereto of a solution of sodium bicarbonate. The mixture is tested for free iodin from time to time, and when the tests show that no more free iodin is present, there is added to the mixture a solution of 1 kilogram of vitreous metaphosphoric acid in 5 liters of water, and thereupon 8 liters of a 25% solution of chlorid of iron is added while stirring. Thereupon dilute aqueous solution of ammonia is added until the mixture gives an alkaline reaction, at which stage a solution is formed. The solution is then separated from the small quantity of impurities by filtration and from the filtrate or solution the new compound is precipitated by means of dilute acid. The precipitate is then washed with water until the wash-water is found to be free of halogen and it is then dried. The new compound so obtained contains about 10% of iron, 11% of $P_2O_5$, 6.5% iodin, and 11% of nitrogen.

Example 6: 5 kilograms of dried white of chicken egg are dissolved in 100 liters of water, and to this solution there is slowly added, while well stirring, a solution of 1.5 kilograms of bromin in 75 liters of water. The mixture is then rendered weakly alkaline with dilute aqueous solution of ammonia. By virtue of this addition a complete solution is formed. Thereupon a solution of 1 kilogram of commercial metaphosphoric acid in 5 liters of water is added while stirring, and then 8 liters of a 25% solution of chlorid of iron is added, the mixture being then treated with ammonia solution until alkaline reaction occurs, and a solution takes place. The resultant solution is then filtered to remove impurities and to the filtrate or purified solution there is then added dilute hydrochloric acid to precipitate the new compound. The precipitate is separated by filtration, thoroughly washed with water, and dried. The new product contains about 11% of iron, 13% of $P_2O_5$, 2.7% of bromin and 11% of nitrogen.

Example 7: 5 kilograms of the new compound resulting from the process described under "Example 1" are dissolved in 150 liters of water, to which is added the necessary quantity of sodium bicarbonate to form the solution. The solution thus formed is then treated with a solution of 1 kilogram of iodin in 1 kilogram of potassium iodid and 5 liters of water, the whole being maintained slightly alkaline by the addition of a sodium bicarbonate solution. As soon as no more free iodin can be detected, the solution is filtered and the new compound is separated from the filtrate by the addition of dilute acid, such as dilute HCl. The precipitate is isolated by filtration; it is washed thoroughly with water and dried. The new compound contains about 6.4% of iron, 8.2% of phosphoric acid anhydrid ($P_2O_5$), 7.7% of iodin, and 11.5% of nitrogen.

From the above examples it will be seen that iron albuminous compounds rich in phosphorus are obtained in all cases, whether these albuminous compounds are free of halogen or contain halogen.

While I have in Examples 1, 2 and 3 described my invention as applied to the production of halogen free iron-albuminous compounds containing phosphorus in illustration of my invention generically considered, I do not herein claim the same specifically, since the same have been thus claimed in my aforesaid application Serial No. 569703. For the same reason I do not herein claim specifically the process in which the iron is caused to react upon the albuminous compound before the metaphosphoric acid radical.

What I claim and desire to secure by Letters Patent is:—

1. The process of making iron-albuminous compounds containing phosphorus, which consists in causing a compound containing the metaphosphoric acid radical to react on an albuminous compound, and then causing an iron compound to react on the same.

2. The process of making iron-albuminous compounds containing phosphorus, which consists in causing metaphosphoric acid to react on an albuminous compound, and then causing an iron salt to react on the same.

3. The process of making iron-albuminous compounds containing phosphorus, which consists in causing a compound containing the metaphosphoric acid radical to react on a halogenated albumin, and then causing an iron compound to react on the resultant product.

4. The process of making iron-albuminous compounds containing phosphorus, which consists in causing a soluble iron compound and a compound containing the metaphosphoric acid radical to react on a halogen-albuminous compound.

5. The process of making iron-albuminous compounds containing phosphorus, which consists in causing a soluble iron compound and metaphosphoric acid to react on halogen-albuminous compound.

6. The process of making iron-albuminous compounds containing phosphorus, which consists in causing a compound containing the metaphosphoric acid radical to react on a halogen-albuminous compound, and then causing an iron compound to react on the same.

7. As a new composition of matter, a halogen iron-albuminous compound containing phosphorus and having the following properties: it is soluble in dilute alkalis or dilute solutions of alkali-carbonate, insoluble in water and organic solvents; when dissolving it with aid of sodium carbonate it gives rise to a green color on adding ammonium sulfid; it is insoluble in pepsin combined with hydrochloric acid; phosphoric acid can be detected therein only upon decomposition or incineration; when reacting on the same with pepsin combined with hydrochloric acid no halogen is liberated.

In testimony whereof I hereunto affix my signature in the presence of two witnesses.

FRITZ ZUCKMAYER. [L. S.]

Witnesses:
ALFRED HENKEL,
E. VOSS.